May 17, 1932.    C. H. TAYLOR    1,858,348
BRAKE MECHANISM
Original Filed May 19, 1924    3 Sheets-Sheet 2
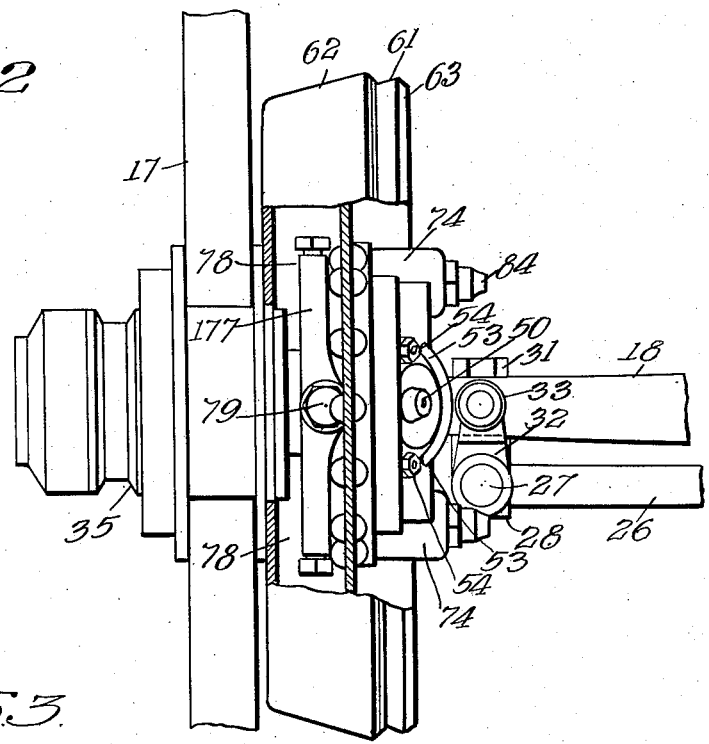
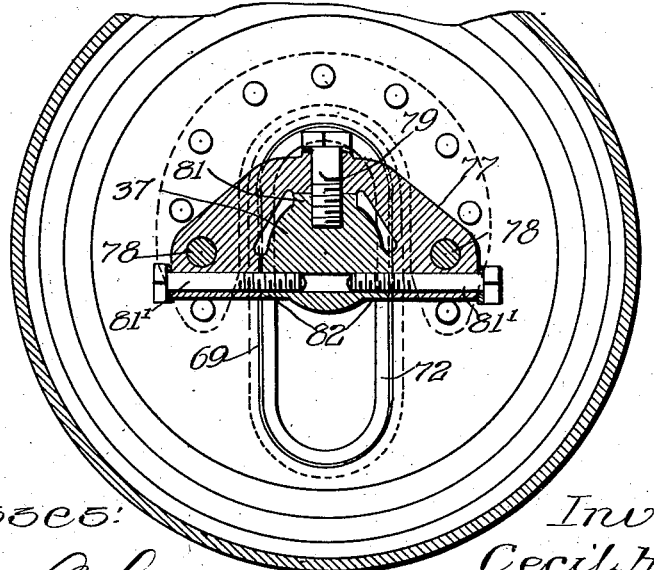

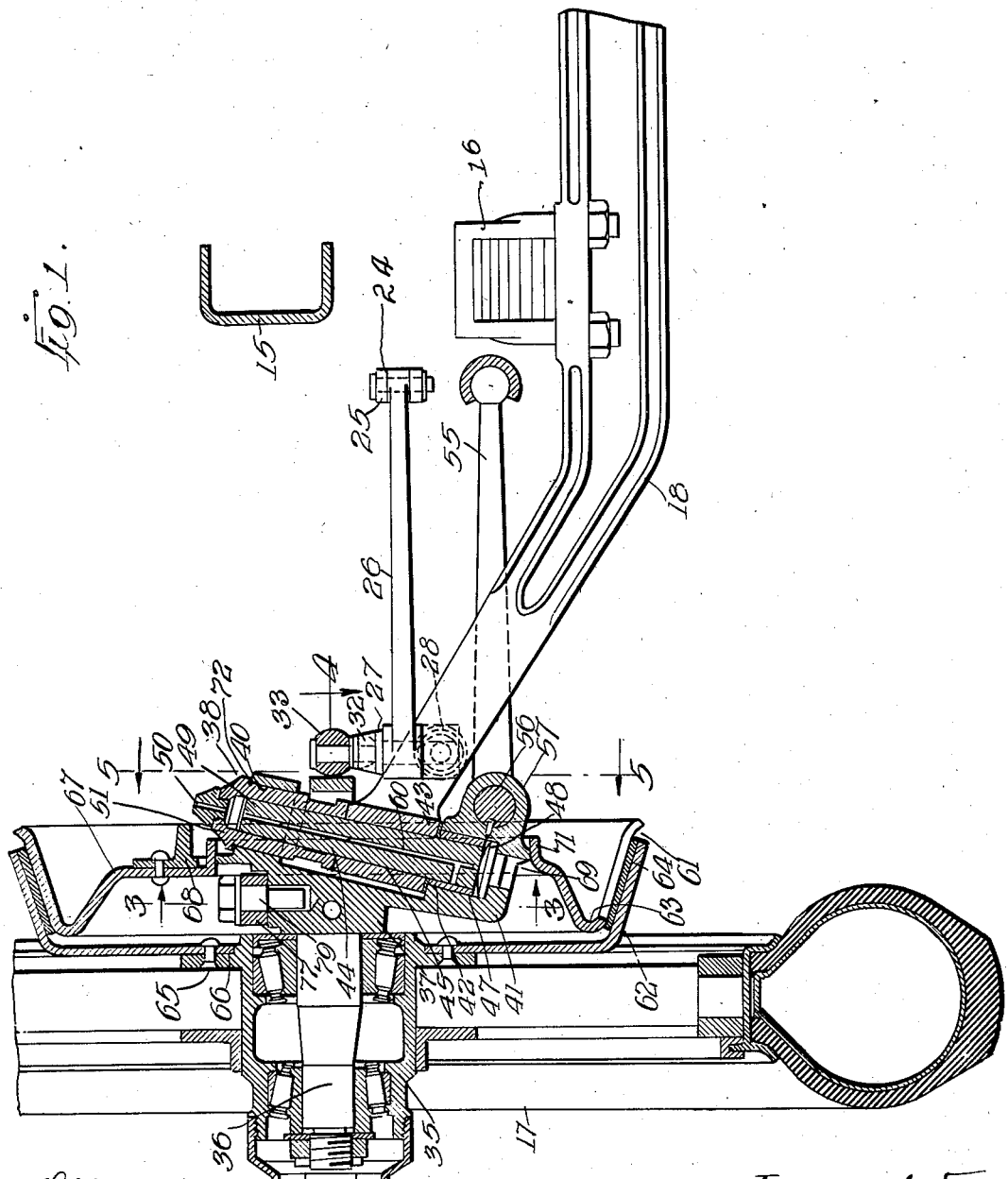

May 17, 1932.　　　　C. H. TAYLOR　　　　1,858,348
BRAKE MECHANISM
Original Filed May 19, 1924　　3 Sheets-Sheet 3
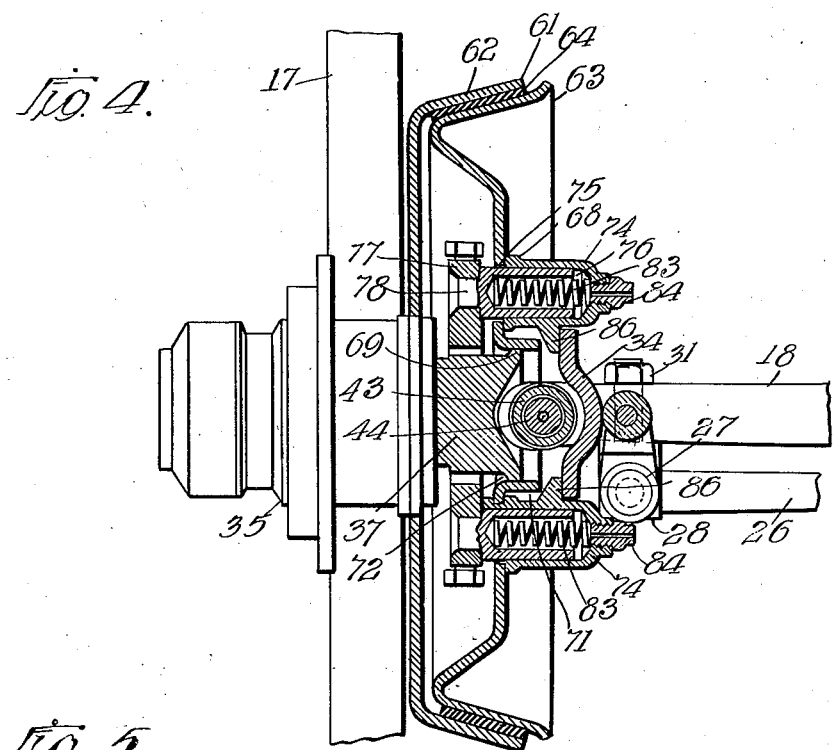
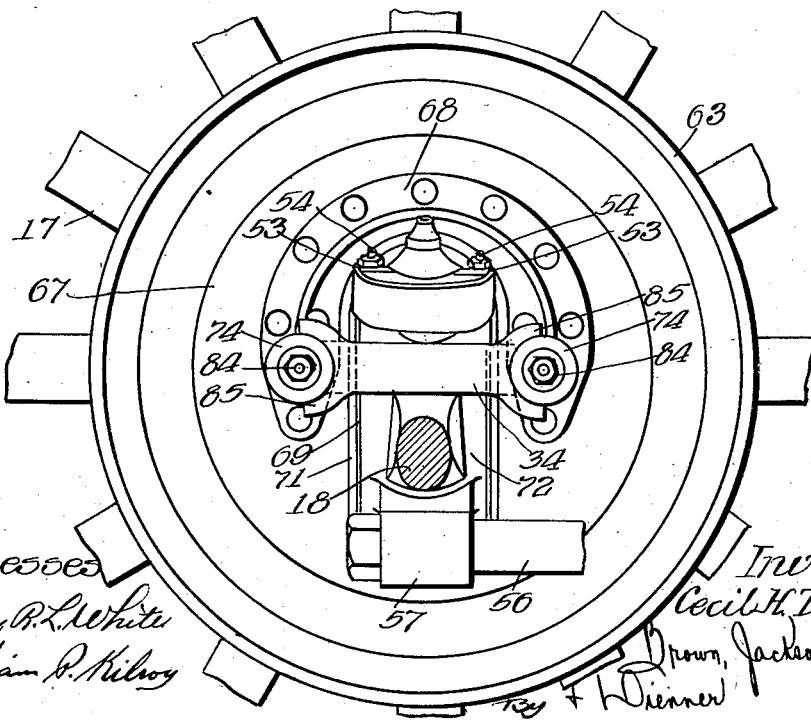

Patented May 17, 1932

1,858,348

UNITED STATES PATENT OFFICE

CECIL HAMELIN TAYLOR, OF DETROIT, MICHIGAN, ASSIGNOR TO BENDIX BRAKE COMPANY, OF SOUTH BEND, INDIANA, A CORPORATION OF ILLINOIS

BRAKE MECHANISM

Original application filed May 19, 1924, Serial No. 714,187. Divided and this application filed December 22, 1928. Serial No. 327,847.

My invention pertains in general to steering wheel mechanism and more particularly to a novel brake.

The brake of my construction is of general application as far as steering wheels are concerned but is particularly adapted for conjunction with the braking system disclosed in my copending patent application, Serial No. 714,187 filed May 19, 1924, from which the present subject matter was divided.

In automobile practice, it is desirable that maximum braking force be applied to the front or steering wheels when they are in their normal position and pointed straight ahead. On the other hand, when the steering wheel is disposed at an angle to its normal position, maximum braking force should not be applied to it for the reason that to do so would frequently result in the front wheel being locked and thus permitting it to act as a skid.

I propose to provide novel brake mechanism which will tend to prevent the steering wheels from being locked when out of their normal position and thus minimize skidding as far as the front wheels are involved.

Furthermore, the braking mechanism of my invention is so constructed that it will have maximum braking efficiency when the steering wheel is in its normal position and pointed straight ahead. Also the mechanism includes means for enabling any desired braking effectiveness for the different angular positions of the steering wheel with respect to its normal position. This construction results in less braking efficiency when the steering wheel is moved out of its normal position, the degree to which said efficiency is decreased depending upon the position of the wheel.

Moreover, I provide in my novel brake mechanism a plurality of telescoping tubular guides for taking up lateral thrust when the wheel is turned at an angle to its normal position. These guides serve as housings for springs which at all times tend to urge the male brake element out of cooperation with the female brake element. These springs preferably urge the male element in a direction parallel to the axis of the wheel.

Other objects and advantages of my invention will more fully appear from the following detail description taken in connection with the accompanying drawings which illustrate one embodiment thereof and in which, Figure 1 is a fragmentary sectional view through a steering wheel of a motor vehicle and the associated steering wheel mechanism of my invention.

Figure 2 is a plan view somewhat reduced in size of the mechanism illustrated in Fig. 1.

Figure 3 is a sectional view taken on substantially the line 3—3 of Fig. 1 looking in the direction indicated by the arrows.

Figure 4 is a sectional view taken on substantially the line 4—4 of Fig. 1 looking downwardly; and Figure 5 is a sectional view taken on the line 5—5 of Fig. 1 looking in the direction indicated by the arrows.

Referring now to the drawings in detail, in which like reference numerals designate similar parts throughout the several views, 15 designates generally a part of an automobile chassis (Fig. 1). The chassis 15 has connected thereto the usual leaf spring construction 16 which carries the conventional front axle 18. The axle 18 has mounted thereon a pair of steering wheels 17, one of which is illustrated in the accompanying drawings.

Associated with the axle 18 is the forward end of an operating rod 24 which has pivotal connection through a clevis 25 with the end of a relatively long brake arm 26. I desire it understood that although I shall describe in detail the mechanism associated with one steering wheel, the same is not to be limited to the one wheel for it applies equally well to the other front wheel of the vehicle. Each of the front wheels of the vehicle have similar brake and steering mechanism, as will be obvious from the accompanying description.

A pivot pin 27 pivotally supports the arm or lever 26 on a bearing block 28. This bearing block 28 is rigidly secured to the front axle 18 of the car by a stud bolt 31. Extending substantially at right angles to the arm 26 is another short arm 32, which curves upwardly to support a roller 33 substantially in the axial plane of the front wheel 17. This roller applies the front wheel brake by pressing against the arcuate presser bar 34, as will presently appear.

Each wheel 17 is of any conventional design, and has a hub 35 suitably supported by roller bearings on a spindle 36. It will be observed from Fig. 1 that I have provided two sets of roller bearings spaced a given distance apart and supported on the spindle 36. The spindle projects from a relatively larger portion 37 forming part of the entire steering knuckle 38. From the upper part of the portion 37, an upper bearing lug 39 projects inwardly toward the frame of the car, and at a slight angle from the horizontal. Also extending from the lower part of this portion 37 is a depending bearing lug 41 which is similarly inclined to the horizontal. The bore 40 of the upper bearing lug 39 is aligned with the bore 42 of the lower bearing lug and an axial line through these bores intersects the road surface substantially at the same point of contact as a vertical center line through the wheel 17.

The end of the front axle 18 has a head 43 bored out with a tapered tool to form a tapered bore in which seats a tapered shank 45 of a pivot pin 44. The lower end of the pivot pin is cylindrical for fitting within a bearing bushing 47 in the bore 42. A disk 48 having a spherical top and preferably constructed of hardened metal is seated in the bottom of the bore 42 and carries the end thrust transmitted through the pivot pin 44.

The upper cylindrical end 49 of this pivot pin extends up into a cylindrical bore in the removable bushing or bearing sleeve 51. This bearing sleeve is supported in the upper bore 40 and extends down to approximately the top of the head 43, the bearing rotation occurring between this sleeve 51 and the pivot pin 44. The sleeve 51 is readily removable from the boss 39 and has a flange on its upper end forming lateral bolting ears 53 through which are passed bolts 54 threaded into the boss 39.

In assembling the steering knuckle, this sleeve 51 is left out of the boss or bearing 39 until the pivot pin 44 is in position. The tapered shank 45 of the pivot pin is rigidly wedged into the head 43 of the axle, and in the first step of assembly the upper end of this pivot pin is hooked up through the bearing 39 to bring the top of the head 43 up to approximately the bottom of the bearing 39, after which the cylindrical lower end of the pivot pin is dropped back into the lower bearing bushing 47. Thereafter, the bearing sleeve 51 is slipped down over the cylindrical upper end of the pivot pin, and is rigidly fastened to the upper lug 39 by bolts 54. A grease cup or lubricant nipple 50 screws into the top of the sleeve 51 and permits the introduction of lubricant to the bearing surfaces around the top of the pivot pin and through the duct 60 to the bearing surfaces around the lower end of the king-bolt.

Steering motion is given the wheel through a suitable steering arm 55 having a laterally extending shank 56 which is rigidly keyed in a hub or socket 57 extending from the lower bearing lug 41. The other end of this shank portion 56 may extend forwardly and make any suitable connection with the tie rod extending across to the other front wheel for causing simultaneous steering motion of both wheels. It was not believed necessary to illustrate the tie rod since it does not per se constitute part of the present invention and may be of any conventional construction.

The brake for this front wheel is indicated at 61 and is preferably of the conical clutch type. The female element 62 of the brake 61 rotates with the wheel 17 and the male element 63 is non-rotatably connected with the steering knuckle. A brake lining 64 is preferably interposed between these two brake elements, as best shown in Fig. 1. Also the male brake element 63 may be slotted at intervals, as indicated in Fig. 1, in which latter case the brake lining 64 would be preferably secured to the male brake element. The web of the female brake element 62 is secured by rivets 65 to an inner flange 66 extending outwardly adjacent the inner end of the wheel hub 35.

The web of the male brake element 63 is set back as indicated at 67 and to this web is riveted a flanged yoke 68. To permit the passing of the steering knuckle, the latter is provided with an elongated opening 69 formed with an inwardly turned marginal flange 71, as shown in Figs. 3 and 5.

The swinging part of the steering knuckle is formed with a flange 72 lying in a vertical plane and extending above and below the bearing lugs 39 and 41 to snugly fit within the opening 69. This precludes the entrance of stones, dirt or other analogous foreign matter into the space between the two brake drums.

Referring to Figs. 4 and 5, the two ends of the yoke 68 are formed with cylindrical guides 74—74. These guides align with holes 75 in the web of the drum 63 and extending through these holes and having guided engagement in the members 74 are sleeve guides 76. The sleeve guides 74 are riveted in the end of a mounting yoke 77, as indicated at 78. As shown in Fig. 3, this yoke 77 is mounted astride the portion 37 of the steering knuckle. A bolt 79 passes down through the top of the yoke and taps into a flat-topped boss 81, thereby securing the yoke in one plane. The ends of the yoke are drilled out for the reception of bolts or cap screws 81', which screw into the member 37 and clamp the ends of the yoke to the flat boss extensions 82. It will be apparent from the foregoing that the yoke 77 is thus rigidly secured to the hub portion 37 of the steering knuckle so that the yoke swings therewith and that the tubular guides 76 on this yoke carry the male braking drum in alignment with the female drum 62.

Compression springs 83 are confined between the inner ends of the tubular guides 76 and the inner ends of the guide cylinders 74. These springs normally retain the two braking elements out of frictional engagement. Grease cups or lubricant receiving nipples 84 in the ends of the guide cylinders 74 permit the introduction of lubricant into the spring chambers.

The arcuate presser bar 34 has forked ends 85 which embrace the inner sides of the spring or guide cylinders 74. As shown in Fig. 4, the ends of the presser bar bear against lugs 86 projecting inwardly from the spring confining cylinders 74. The outer curve of the presser bar 34 is preferably concentric with the axis extending down through the pivot pin 44, although this outer surface may be eccentric or of a different curvature to give any desired braking effectiveness for different angular positions of the steering wheel. This is in accordance with the desired object of producing a maximum braking effect on the front wheels when they are pointed straight ahead, but reducing this braking effect as the wheels are turned in either direction, so that when turned the wheels cannot be locked and thereby act as skids. In the majority of instances, however, there need be no special design or eccentric curvature given this outer surface of the presser bar 34 owing to a cooperative action existing between the cone clutch type of brake and a steering wheel. It will be noted that the roller 33 transmits a braking thrust to the presser bar 34 along a line extending substantially longitudinally of the front axle 18.

When the axis of the steering wheel is in substantial prolongation of this axis of the axle 18, this thrust is of maximum efficiency for forcing the brake elements together. On the other hand, when the wheel is turned at an angle, a considerable part of this thrust from the roller 33 is taken up as lateral thrust imposed upon the tubular guides 76 so that the braking pressure transmitted to the male brake element is reduced, and to a degree depending upon the angularity of the wheel.

The operation of my novel steering wheel mechanism is believed to be evident from the foregoing detail description of the same. It will be obvious that the brake mechanism has maximum braking efficiency when the steering wheel is in its normal position and pointed straight ahead; also my brake mechanism enables any desired braking effectiveness for the different angular positions of the steering wheel with respect to its normal position. Moreover, the curvature of the presser bar renders the braking force of the mechanism of less efficiency when the wheel is moved out of its normal position into an angular position, the degree to which said efficiency is decreased depending upon the angular position of the wheel. This arrangement prevents the wheels from being locked when they are turned, thus eliminating to a considerable extent the possibility of the wheels serving as skids. However, when the wheels are pointed straight ahead maximum braking force will be applied to them by the mechanism of my construction through the presser bar previously described.

Also, as is obvious from the foregoing description, the telescoping guides perform two functions, viz. the guiding of the male brake element so that it will be properly aligned at all times with the female element and the housing of the compression springs for urging the male brake element out of cooperation with the female element.

Now, I desire it understood that although I have illustrated and described in detail the preferred embodiment of my invention, the invention is not to be thus limited but only insofar as defined by the scope and spirit of the appended claims.

I claim:

1. In combination, a vehicle steering wheel, and a cone clutch brake associated therewith having maximum braking efficiency when said wheel is in its normal position, said mechanism including means for varying the braking effectiveness for various angular positions of the steering wheel with respect to its normal position.

2. In combination, a vehicle steering wheel, and a cone clutch brake associated therewith having maximum braking efficiency when said wheel is in its normal position, said mechanism including means for rendering the braking force of said mechanism of less efficiency when said wheel is moved out of its normal position, the degree to which said efficiency is decreased depending upon the angular position of said wheel.

3. In combination, a vehicle steering wheel, and a cone clutch brake associated therewith having maximum braking efficiency when said wheel is in its normal position and means for varying the braking effectiveness for the different angular positions of the steering wheel with respect to its normal position, said means including telescoping guide members for taking up lateral thrust when said wheel is turned at an angle to its normal position.

4. A brake comprising a spindle, relatively movable friction elements concentric thereto, a support between the elements concentric to the spindle, a compression member between the support and one of the friction elements and means for engaging the elements against the resistance of the compression member.

5. A brake comprising a spindle, relatively movable friction elements concentric thereto, a support intermediate the elements and concentric to the spindle, compression members on the support and means associated with one of the friction elements for engaging the friction elements against the resistance of the compression members.

6. A brake comprising a spindle, relatively movable friction elements concentric thereto, a fixed support arranged concentric to the spindle and intermediate the elements, a compression member positioned between the fixed support and one of the elements and means for applying force to engage the elements against the resistance of the compression member.

7. A brake comprising a spindle, relatively movable friction elements concentric thereto, a fixed support arranged concentric to the spindle and intermediate the elements, compression members between the support and one of the friction elements and means for engaging the friction elements against the resistance of the compression members.

8. A brake comprising relatively movable friction elements, a fixed support between the elements, sleeves positioned on the support, sleeves positioned on one of the friction elements telescoping the sleeves on the fixed support, compression members positioned in the sleeves and a thrust receiving member embracing the sleeves on the friction element.

9. A brake comprising external and internal friction elements, a fixed support between the elements, sleeves positioned on the support extending through openings in the internal element, sleeves on the internal element telescoping the sleeves on the support, compression members positioned in the sleeves and means for moving the internal element against the resistance of the compression members to engage the external and internal elements.

10. A brake comprising internal and external friction elements, a fixed support between the elements, sleeves on the support projecting through openings in the internal element, sleeves on the internal element telescoping the sleeves on the support, coil springs in the sleeves and a thrust receiving member embracing the sleeves on the internal element.

11. In a brake mechanism, the combination with a dirigible wheel, a spindle supporting the wheel, a drum on the wheel having a tapered inner periphery and a drum having a tapered periphery adapted for co-operation therewith and movable axially with respect thereto, of a stationary support on the spindle, sleeves on the support extending through openings in the axially movable drum, sleeves on the axially movable drum telescoping the sleeves on the support, coil springs in the sleeves and a thrust receiving member embracing the sleeves on the drum.

12. In a brake mechanism, the combination with a dirigible wheel, a spindle supporting the wheel, a braking element carried by the wheel and an axially movable braking element, of a support on the spindle between the braking elements, means intermediate the support and the axially movable braking element for normally retaining the braking elements in spaced relation and a thrust receiving member on the axially movable friction member.

13. In a brake mechanism, the combination with a dirigible wheel positioned for rotation on a spindle, a friction element carried by the wheel and an axially movable friction element adapted for cooperation therewith, of a fixed support intermediate the friction elements, a compression member between the fixed support and the axially movable element and a thrust receiving member for moving the axially movable member against the resistance of the compression member to engage the friction elements.

14. In a brake mechanism, the combination with a dirigible wheel positioned for rotation on a swivelled spindle, a friction element carried thereby and an axially movable friction element adaptable for cooperation therewith, of a fixed support intermediate the friction elements, a plurality of sleeves on the fixed support extending through openings in the axially movable element, sleeves on the axially movable element telescoping the sleeves on the support, coil springs in the sleeves normally retaining the friction elements in spaced relation and a thrust receiving member embracing the sleeves on the axially movable elements for compressing the springs to engage the friction elements.

15. In a brake mechanism, the combination with a dirigible wheel positioned for rotation on a swivelled spindle, a friction element carried by the wheel and an axially movable friction element adapted for cooperation therewith, of a fixed support on the spindle between the friction elements, sleeves on the fixed support extending through openings in the axially movable element, sleeves on the axially movable element telescoping the sleeves on the fixed support, coil springs in the sleeves and a member embracing the sleeves on the axially movable element having an arcuate body adapted to receive thrust for compressing the springs and engage the friction elements.

In witness whereof, I hereunto subscribe my name this 8th day of December, 1928.

CECIL HAMELIN TAYLOR.